Dec. 13, 1932. B. F. ALBITZ 1,891,036
LENS FOR EYEGLASSES AND PROCESS FOR MAKING SAME
Filed March 13, 1930
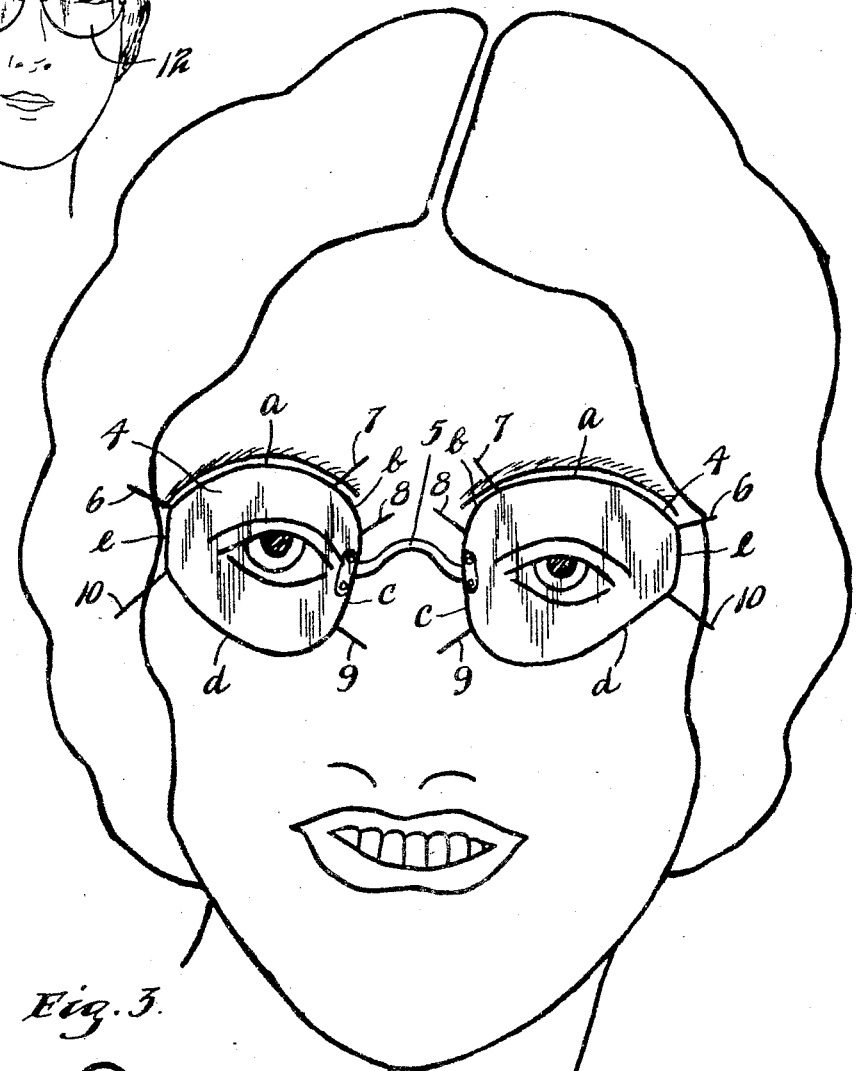
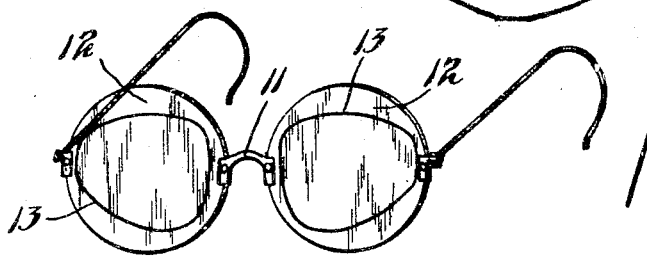
INVENTOR.
BENJAMIN F. ALBITZ.
BY HIS ATTORNEYS.

Patented Dec. 13, 1932

1,891,036

UNITED STATES PATENT OFFICE

BENJAMIN F. ALBITZ, OF MINNEAPOLIS, MINNESOTA

LENS FOR EYEGLASSES AND PROCESS FOR MAKING SAME

Application filed March 13, 1930. Serial No. 435,445.

This invention relates to ophthalmic lenses and to processes for making the same.

At the present time, lenses for eyeglasses are made in a number of different standard shapes and these shapes have no correlation necessarily with the facial characteristics of wearers of glasses made up from these lenses. It often results, therefore, that when a person puts on glasses, the appearance of his face will be materially altered. It is, of course, a well known fact that many people avoid wearing glasses for the reason that they object to having their appearance changed by reason of the glasses.

It is an object of the present invention, therefore, to provide lenses for eyeglasses of novel and improved shape which will not change the characteristics of the face of the wearer, except possibly to improve the appearance of the same.

A more detailed object is to provide a glasses lens, the edges of which are cut to conform in curvature to various characteristic lines or features of the face of the wearer.

Yet another object is to provide a pair of glasses which can be used by wearers having long, narrow faces, to make their faces appear shorter and wider, and can be used by wearers having short and wide faces, to make their faces appear narrower and longer.

Yet another object is to provide glasses lenses, which instead of interfering with the facial expressions of the wearer, as is the usual case with glasses, will not interfere with the facial expressions.

Still another object is to provide ophthalmic lenses which will eliminate irritation to extrinsic muscles and nerves of the eye caused by apparent edges of lenses focused on the indirect field of the retina of the eyes.

A further object is to provide a novel process for patterning glasses lenses which lenses will not change the characteristics of the face of the wearer.

These and other objects and advantages of the present invention will more fully appear from the following description made in connection with the accompanying drawing, wherein like reference characters refer to the same or similar parts throughout the various views and, in which, Fig. 1 is a view illustrating a pair of glasses made in accordance with the present invention, and placed in wearing position on the face of the wearer for whom the lenses are designed;

Fig. 2 is a view illustrating a pair of glasses in place on the face of a wearer, which glasses are used in determining the cut of the lenses for the glasses to be provided for the wearer, and Fig. 3 is a perspective view illustrating the glasses shown in Fig. 2 with certain marking thereon.

Referring to the drawing, the head of a woman wearing glasses made in accordance with the present invention is illustrated, the glasses consisting of the two lense 4 and the nose bridge 5 connecting the lenses. The lenses 4 may be constructed from any type of glass or other transparent material curved and tinted as desired, to suit the peculiar requirements of the wearer. The upper edge portions $a$ of the lenses 4 between the lines 6 and 7 are cut to conform in general curvature to the curvature of the eyebrows of the particular wearer for whom the lenses are made. The upper inner corner edges $b$ of the lenses are cut to conform in general curvature to the curves formed between the eyebrows and the nose of the wearer for whom the glasses are designed. The inner edges $c$ of the lenses between the lines 8 and 9 are cut to conform in curvature generally to the curvature of the sides of the nose of the wearer. The lower edges $d$ of the lenses between the lines 9 and 10 are cut to conform generally in curvature to the line of the chin and jaw of the wearer. The outer side edges $e$ of the lenses between lines 10 and 6 are cut to conform generally in curvature to the side curvature of the cheeks of the wearer.

By cutting the edges of the lenses in this manner, the appearance of the face of the wearer when glasses are placed thereon will not be changed from the appearance of the face when the glasses are not worn. The curvature of the edge portions of the lenses do not affect the appearance of the face to change the same for the reason that the lines of the face are preserved and the natural expression of the face is not interfered with by new lines produced on the face at variance with the natural lines of curvature of the face as is the usual case with ordinary glasses of standard shape. For example, the expression of the eyebrows is not interfered with, for the reason that the curvature of the portions a of the edges of the lenses is the same as the curvature of the eyebrows and serves, if anything, to accentuate the eyebrows. In the ordinary eyeglasses where the lenses are cut with no correlation to the features of the face, irritation to extrinsic muscles and nerves often results, caused by apparent edges of the glasses being focused on the indirect field of the retina of the eyes. With glasses constructed in accordance with the present invention, the lenses can be made considerably larger than ordinary eyeglass lenses to bring the edges of the lenses out of the indirect field of vision of the eyes without, at the same time, making the lenses appear too large for the face.

If the glasses are to be fitted to an unusually wide face, the portions a and d can be increased in length relative to the length of the other edge portions b, c and e and this will have the effect of making the face appear less wide. Similarly, if the glasses are to be fitted to a narrow face, the edge portions c and e may be increased in length relative to the edge portions a, b, and d and the face will appear wider when the glasses are worn. By shortening the length of the portions c of the lenses relative to the other portions of the edges thereof, a short nose may be made to appear longer, while conversely by lengthening the length of the portions c of the lenses, a long nose may be made to appear shorter. By varying the lengths of the different portions a, b, c, d and e of the edges of the lenses, the appearance of the wearer of the glasses may be considerably improved if the wearer has unusual facial characteristics.

One simple process for laying out the pattern to which the lenses for a particular wearer are to be cut is as follows: A pair of spectacles 11 having large circular lenses 12 will be provided and fitted over the eyes of the wearer for which glasses are to be made as illustrated in Fig. 2. The lenses 12 will be of such size that they will extend well over the eyebrows much in the manner of the old fashioned automobile goggles. A china marking pencil or some similar pencil which will mark glass is then used and a line 13 will be drawn with this pencil or the like, on each lens 12, while the glasses 11 are being worn, the said line 13 being drawn to conform to the various features of the wearer, the curves of which are to be reproduced on the edges of the lenses 4. After the lines 13 are drawn on the lenses 12 of glasses 11, the glasses may be removed and these lines 13 may be traced on the actual lenses 4 to be used for the glasses, whereupon the lenses 4 may be cut out to the desired shape, as determined by these tracing lines. By drawing the lines 13 on the lenses 12 of glasses 11, when applied to the face of the wearer, the pattern for the lenses of the glasses to be made can be very accurately drawn with convenience.

It will, of course, be understood that various changes may be made in the details and proportions and in the relative lengths of the various portions of the edges of the lenses of the present glasses without departure from the scope of the present invention, which generally stated consists in the matter shown and described and set forth in the appended claims.

What is claimed is:—

1. A method of forming an eyeglass lens in which an unfinished lens, somewhat larger than a finished eyeglass lens, is supported before the eye of the person to be fitted, a line shaped to conform to the line of the chin and jaw is traced on the lower portion of said unfinished lens, other suitable lines are traced on the inner, upper and outer portions of said unfinished lens, adjacent ends of adjacent pairs of said traced lines are connected, said connected series of lines defining an area, and said eyeglass lens is cut to have the same shape and size as said area.

2. A method of forming an eyeglass lens in which an unfinished lens, somewhat larger than a finished eyeglass lens, is supported before the eye of the person to be fitted, a line curved to conform to the shape of the side of the nose is traced on the inner portion of said unfinished lens, other suitable lines are traced on the upper, outer, and lower portions of said unfinished lens, adjacent ends of adjacent pairs of said traced lines are connected, said connected series of lines defining an area, and said eyeglass lens is cut to have the same shape and size as said area.

3. A method of forming an eyeglass lens in which an unfinished lens, somewhat larger than a finished eyeglass lens is supported before the eye of the person to be fitted, a line curved to conform to the curve of the upper portion of the nose adjacent the eyebrow is traced on the upper and inner portion of said unfinished lens, other suitable lines are traced on the upper, outer, lower and inner portions of said unfinished lens, adjacent ends of adjacent pairs of said traced lines are connected, said connected series of lines defining an area, and said eyeglass lens is cut to have the same shape and size as said area.

4. A method of forming an eyeglass lens in which an unfinished lens, somewhat larger than a finished eyeglass lens, is supported before the eye of the person to be fitted, a line curved to conform to the curvature of said person's eyebrow is traced on the upper portion of said unfinished lens, a line curved to conform to the curve of the upper portion of the nose adjacent the eyebrow is traced on the upper and inner portion of said unfinished lens, a line curved to conform to the shape of the side of the nose is traced on the inner portion of said unfinished lens, a line shaped to conform to the line of the chin and jaw is traced on the lower portion of said unfinished lens, and a line curved in accordance with the side curvature of the cheek is traced on the outer portion of said unfinished lens, the adjacent ends of adjacent pairs of said traced lines being connected, said connected series of lines defining an area, and said eyeglass lens is cut to have the same shape and size as said area.

In testimony whereof I affix my signature.

BENJAMIN F. ALBITZ.